United States Patent
Li et al.

(10) Patent No.: US 12,033,078 B2
(45) Date of Patent: Jul. 9, 2024

(54) SEQUENCE-OF-SEQUENCES MODEL FOR 3D OBJECT RECOGNITION

(71) Applicant: Snap Inc., Santa Monica, CA (US)

(72) Inventors: Yuncheng Li, Los Angeles, CA (US); Zhou Ren, Bellevue, WA (US); Ning Xu, Irvine, CA (US); Enxu Yan, Los Altos, CA (US); Tan Yu, Singapore (SG)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/230,499

(22) Filed: Aug. 4, 2023

(65) Prior Publication Data

US 2023/0376757 A1    Nov. 23, 2023

Related U.S. Application Data

(63) Continuation of application No. 17/878,591, filed on Aug. 1, 2022, now Pat. No. 11,755,910, which is a
(Continued)

(51) Int. Cl.
*G06N 3/08* (2023.01)
*G06F 18/214* (2023.01)
(Continued)

(52) U.S. Cl.
CPC .............. *G06N 3/08* (2013.01); *G06F 18/214* (2023.01); *G06F 18/2431* (2023.01);
(Continued)

(58) Field of Classification Search
CPC ...... G06V 20/64; G06V 10/454; G06V 10/82; G06V 20/20; G06V 20/41; G06K 9/6256; G06K 9/628; G06N 3/08; G06N 3/0445; G06N 3/0454; G06N 3/044; G06N 3/045; G06T 7/344; G06T 7/55; G06T 7/11; G06T 19/006; G06T 2207/10016; G06T 2207/10028; G06T 2207/30196;
(Continued)

(56) References Cited

U.S. PATENT DOCUMENTS 9,445,081 B1    9/2016    Kouperman et al.
10,750,213 B2    8/2020    Breitenfeld et al.
(Continued)

OTHER PUBLICATIONS

"U.S. Appl. No. 16/870,138, Notice of Allowance dated Mar. 29, 2022", 13 pgs.
(Continued)

*Primary Examiner* — Michael S Osinski
(74) *Attorney, Agent, or Firm* — SCHWEGMAN LUNDBERG & WOESSNER, P.A.

(57) ABSTRACT

Systems and methods are disclosed for capturing multiple sequences of views of a three-dimensional object using a plurality of virtual cameras. The systems and methods generate aligned sequences from the multiple sequences based on an arrangement of the plurality of virtual cameras in relation to the three-dimensional object. Using a convolutional network, the systems and methods classify the three-dimensional object based on the aligned sequences and identify the three-dimensional object using the classification.

20 Claims, 13 Drawing Sheets

Related U.S. Application Data continuation of application No. 16/870,138, filed on May 8, 2020, now Pat. No. 11,410,439.

(60) Provisional application No. 62/845,471, filed on May 9, 2019.

(51) Int. Cl.

| | | |
|---|---|---|
| *G06F 18/2431* | (2023.01) | |
| *G06T 7/33* | (2017.01) | |
| *G06T 7/55* | (2017.01) | |
| *G06V 10/44* | (2022.01) | |
| *G06V 10/82* | (2022.01) | |
| *G06V 20/20* | (2022.01) | |
| *G06V 20/40* | (2022.01) | |
| *G06V 20/64* | (2022.01) | |

(52) U.S. Cl.
CPC ............. *G06T 7/344* (2017.01); *G06T 7/55* (2017.01); *G06V 10/454* (2022.01); *G06V 10/82* (2022.01); *G06V 20/20* (2022.01); *G06V 20/41* (2022.01); *G06V 20/64* (2022.01)

(58) Field of Classification Search
CPC . G06T 2207/10024; G06T 2207/20021; G06T 2207/20084; G06T 2207/30244; G06T 15/20; G06T 15/205; G06T 3/40; G06F 18/214; G06F 18/2431
See application file for complete search history.

(56) References Cited

U.S. PATENT DOCUMENTS

| | | | |
|---|---|---|---|
| 11,238,304 | B2 | 2/2022 | Veksler |
| 11,276,216 | B2 | 3/2022 | Borovikov et al. |
| 11,308,692 | B2 * | 4/2022 | Ma .................... G06T 17/205 |
| 11,410,439 | B2 | 8/2022 | Li et al. |
| 2016/0063713 | A1 | 3/2016 | Okamoto et al. |
| 2017/0153700 | A1 | 6/2017 | Kondo |
| 2018/0350147 | A1 | 12/2018 | Lodato et al. |
| 2019/0392221 | A1 | 12/2019 | Spencer et al. |
| 2020/0084427 | A1 | 3/2020 | Sun et al. |
| 2020/0312003 | A1 | 10/2020 | Borovikov et al. |
| 2020/0356760 | A1 | 11/2020 | Li et al. |
| 2021/0004933 | A1 | 1/2021 | Wong et al. |
| 2021/0019215 | A1 | 1/2021 | Neeter |
| 2021/0105451 | A1 | 4/2021 | Oyman et al. |
| 2021/0133920 | A1 | 5/2021 | Lee et al. |
| 2021/0213357 | A1 | 7/2021 | Morishita |
| 2021/0274129 | A1 * | 9/2021 | Haaland .................... G06T 7/97 |
| 2021/0312649 | A1 | 10/2021 | Sato et al. |
| 2021/0407179 | A1 | 12/2021 | Nishida |
| 2022/0011130 | A1 | 1/2022 | Hanniel et al. |
| 2022/0189078 | A1 * | 6/2022 | Yoneda .................... G06F 18/24 |
| 2022/0207848 | A1 * | 6/2022 | Islamov ................ G06T 19/006 |
| 2022/0284667 | A1 * | 9/2022 | Park ........................ G06T 17/00 |
| 2023/0034794 | A1 | 2/2023 | Li et al. |

OTHER PUBLICATIONS

"U.S. Appl. No. 17/878,591, Non Final Office Action dated Jan. 11, 2023", 10 pgs.

"U.S. Appl. No. 17/878,591, Notice of Allowance dated Apr. 20, 2023", 8 pgs.

"U.S. Appl. No. 17/878,591, Preliminary Amendment filed Oct. 12, 2022", 6 pgs.

"U.S. Appl. No. 17/878,591, Response filed Apr. 11, 2023 to Non Final Office Action dated Jan. 11, 2023", 7 pgs.

Li, Shaoshuai, et al., "SVNet: A Single View Network for 3D Shape Recognition", 2019 IEEE international Conference on Multimedia and Expo (ICME), (2019), 1648-1653.

Ma, Chao, et al., "Learning Multi-View Representation With LSTM for 3-D Shape Recognition and Retrieval", IEEE Transactions on Multimedia, vol. 21, No. 5, (May 2019), 1169-1182.

Zaki, Hasan F. M, et al., "Modeling 2D Appearance Evolution for 3D Object Categorization", International Conference on Digital Image Computing: Techniques and Applications (DICTA), (2016), 1-8.

* cited by examiner

SEQUENCE-OF-SEQUENCES MODEL FOR 3D OBJECT RECOGNITION

PRIORITY

This application is a continuation of U.S. patent application Ser. No. 17/878,591, filed on Aug. 1, 2022, which is a continuation of U.S. patent application Ser. No. 16/870,138, filed on May 8, 2020, now issued as U.S. Pat. No. 11,410,439, which claims the benefit of priority to U.S. Provisional Patent Application Ser. No. 62/845,471, filed May 9, 2019 which are incorporated by reference herein in their entireties.

TECHNICAL FIELD

Embodiments of the present disclosure generally relate to object recognition. More particularly, but not by way of limitation, the present disclosure addresses systems and methods for a sequence-of-sequences model for three-dimensional object recognition.

BACKGROUND

Three-dimensional object recognition methods based on deep learning can be classified into three categories: multi-view methods, volumetric methods and point-cloud methods. Volumetric methods naturally extend the two-dimensional (2D) convolutional neural network (CNN) to a 3D CNN to process the input 3D volume. Point-cloud methods represent each point of a 3D model in a discrete way.

Multi-view methods project a 3D object into multiple views of different viewpoints. The projected views are fed into a convolutional neural network (CNN) to obtain view-wise features. Since multi-view methods only rely on a traditional CNN, it feasibly supports fine-tuning on off-the-shelf models pre-trained on a large-scale image dataset.

Another approach to multi-view methods is a multi-view convolutional neural network, which pools the views' features through max-pooling. The element-wise max pooling operation retains the activation from one of the views and disregards others.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
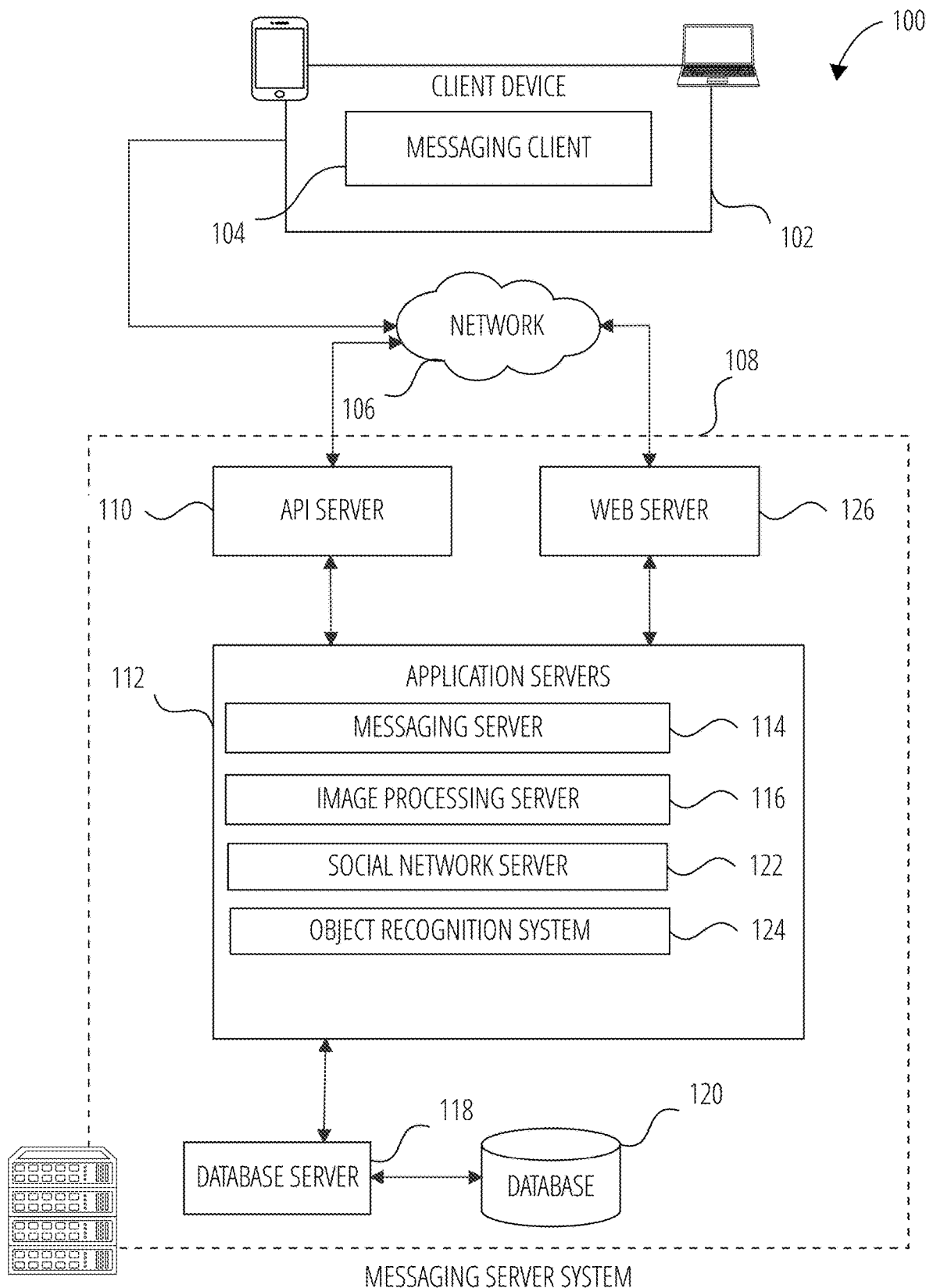
FIG. 1 is a diagrammatic representation of a networked environment in which the present disclosure may be deployed, in accordance with some examples.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

The present disclosure addresses the 3D object recognition problem through modeling the sequence of views. In addition to exploiting the visual appearance provided in the multiple individual project views, the proposed methods and systems further exploits the order of views along the sequence into consideration. The proposed sequence of sequences model therefore not only characterizes the order within each sequence but also models the order among sequences.

The object recognition system captures multiple sequences of views of a 3D object using virtual cameras. Each sequence of the multiple sequences represents a unique order of views of the 3D object. The object recognition system generates an alignment function based on the different starting views within the multiple sequences of views. The starting view is the first view within each unique order of view. The object recognition system aligns the multiple sequences of views using the alignment function to align the multiple sequences of views to a canonical viewpoint. Thus, aligned sequences are generated using the alignment function. The aligned sequences are generated from the multiple sequences based on an arrangement of the virtual cameras in relation to the 3D object. In some examples, the aligned sequences are concatenated into a single vector to generate a concatenated aligned sequence.

Using a convolutional neural network, the object recognition system classifies the 3D object based on the aligned sequences. The object recognition system, in some examples, classifies the 3D object based on the concatenated aligned sequence. The object recognition system identifies the 3D object using the classification.

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 126 is coupled to the application servers 112, and provides web-based interfaces to the application servers 112. To this end, the web server 126 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
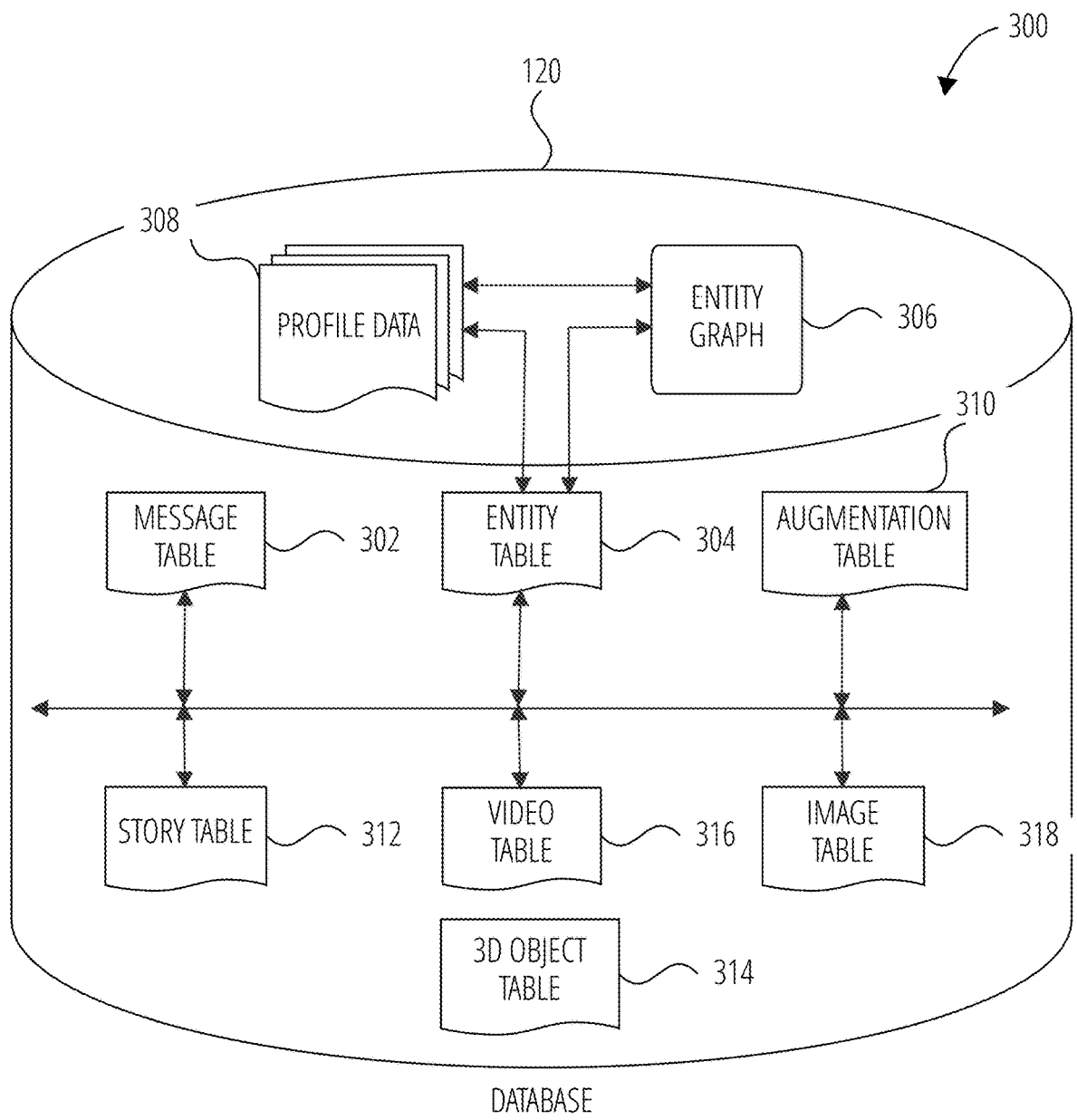
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The object recognition system 124 may include one or more servers and may be associated with a cloud-based application. The object recognition system 124 obtains three-dimensional (3D) object data from a database 120. The object recognition system 124 analyzes 3D objects and automatically identifies the 3D objects based on their classifications. The details of the object recognition system 124 are provided below in connection with FIGS. 6-11.

System Architecture

Figure 2:
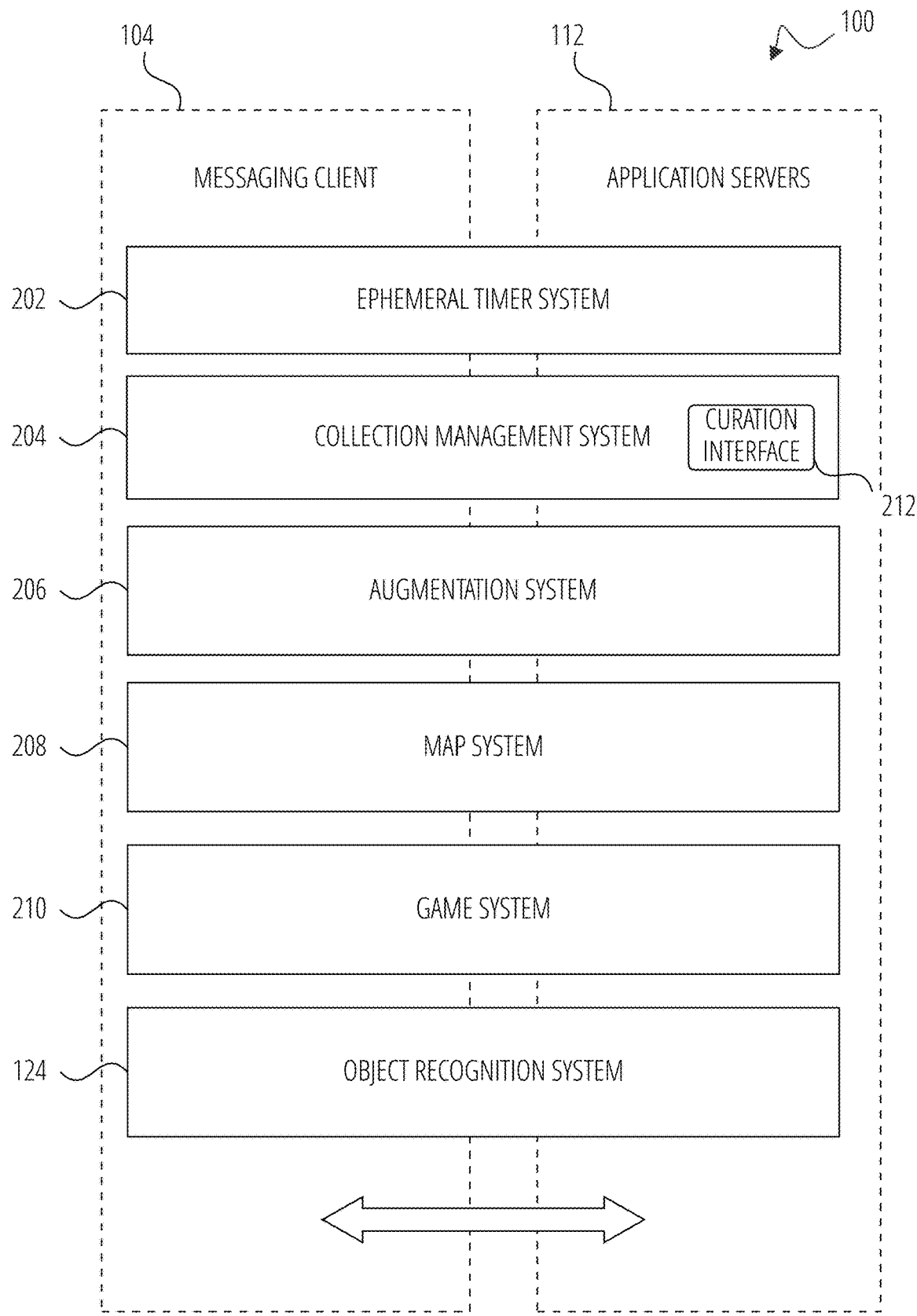
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210, and an object recognition system 124.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The object recognition system 124 obtains 3D object data and automatically identifies the 3D object based on its classification. In some examples, the object recognition system 124 may be supported by the messaging client 104 or the application servers 112.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 316) and images (for which data is stored in an image table 318).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 318 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 316 stores video data that, in one example, is associated with messages for which records are maintained within the message table 302. Similarly, the image table 318 stores image data associated with messages for which message data is stored in the entity table 304. The entity table 304 may associate various augmentations from the augmentation table 310 with various images and videos stored in the image table 318 and the video table 316.

The database 120 can also store 3D object data in the 3D object table 314.

Data Communications Architecture

Figure 4:
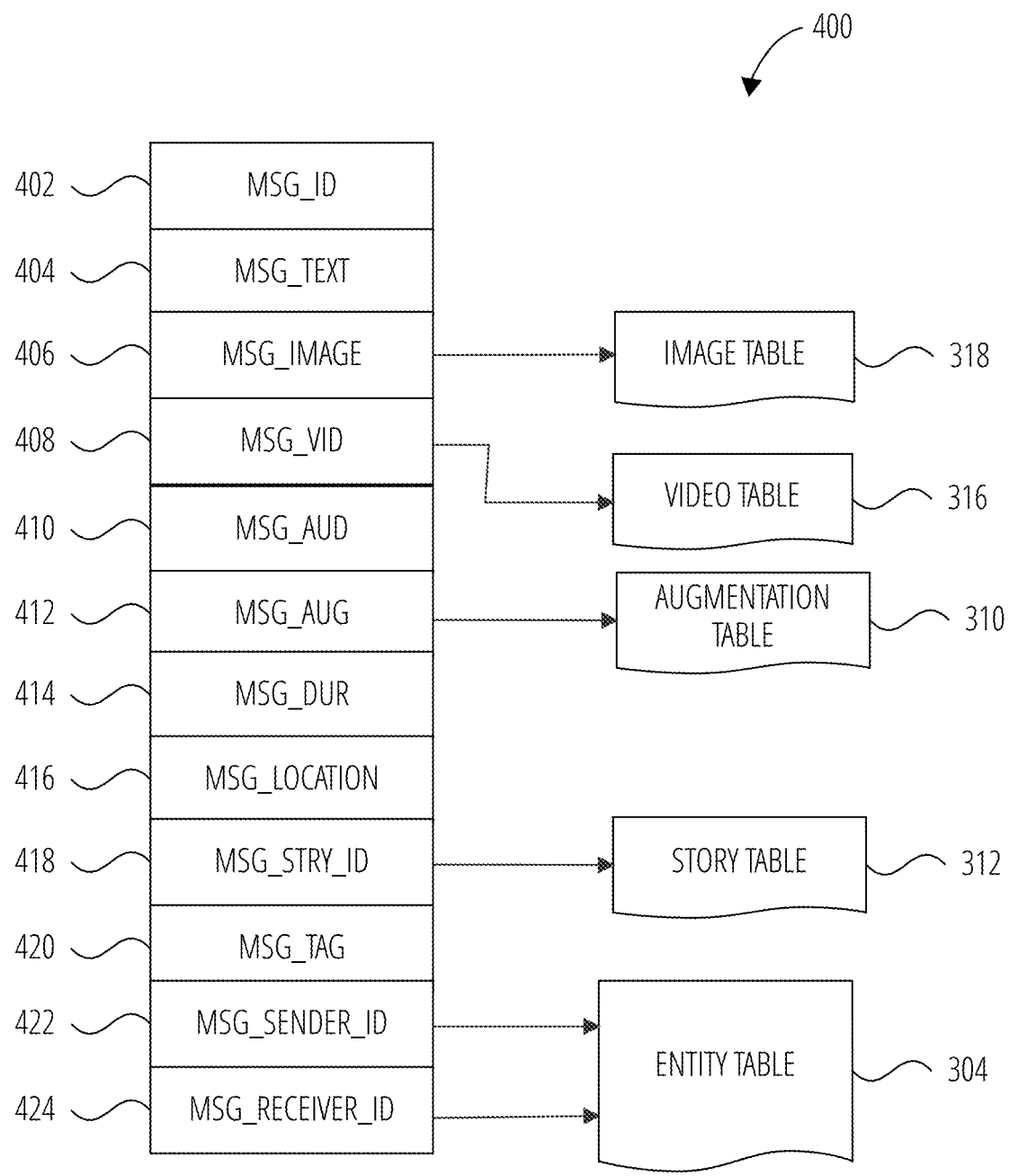
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 318.
- message video payload 408: video data, captured by a camera component or retrieved from a memory component of the client device 102, and that is included in the message 400. Video data for a sent or received message 400 may be stored in the video table 316.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within a video table 316, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
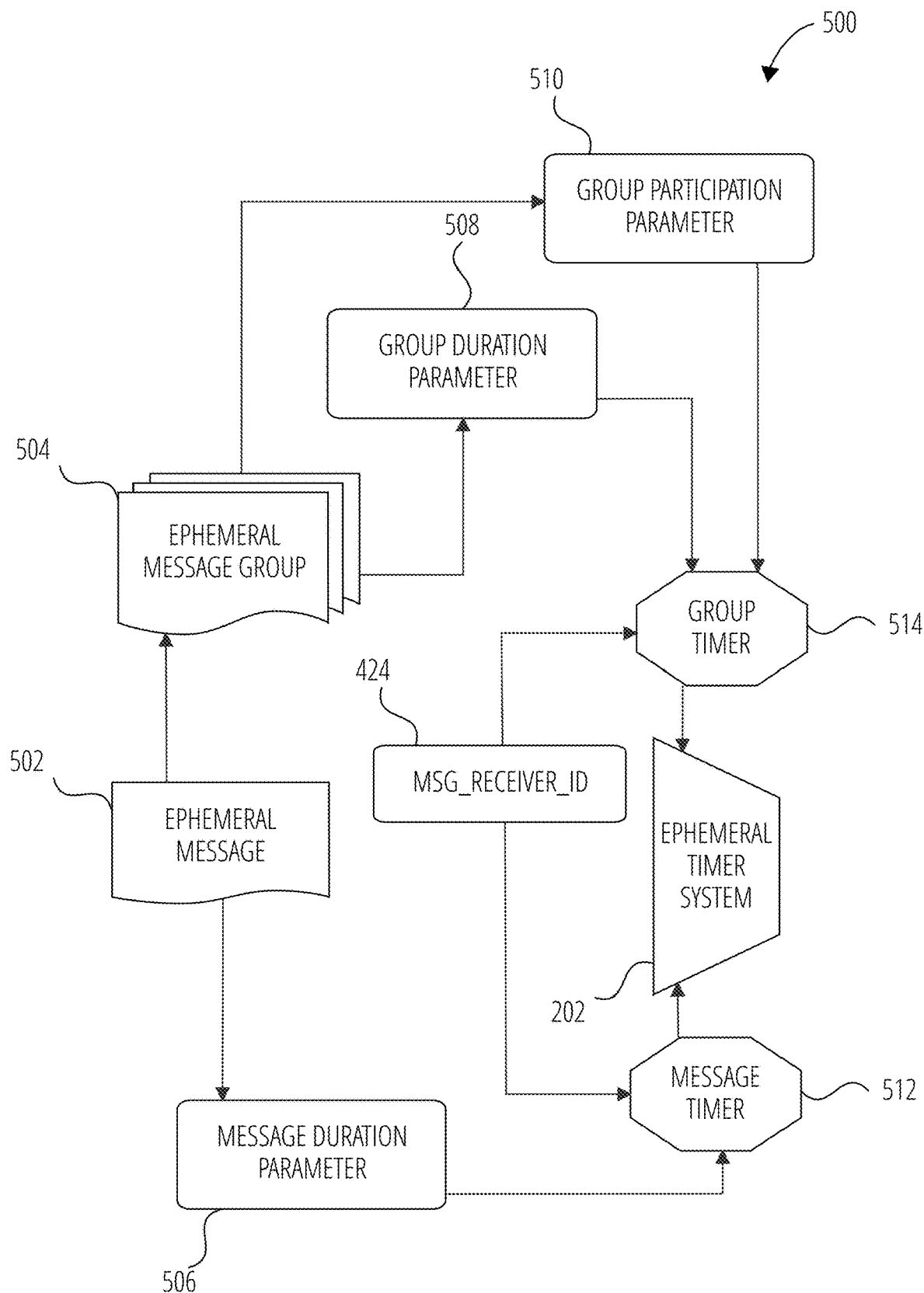
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
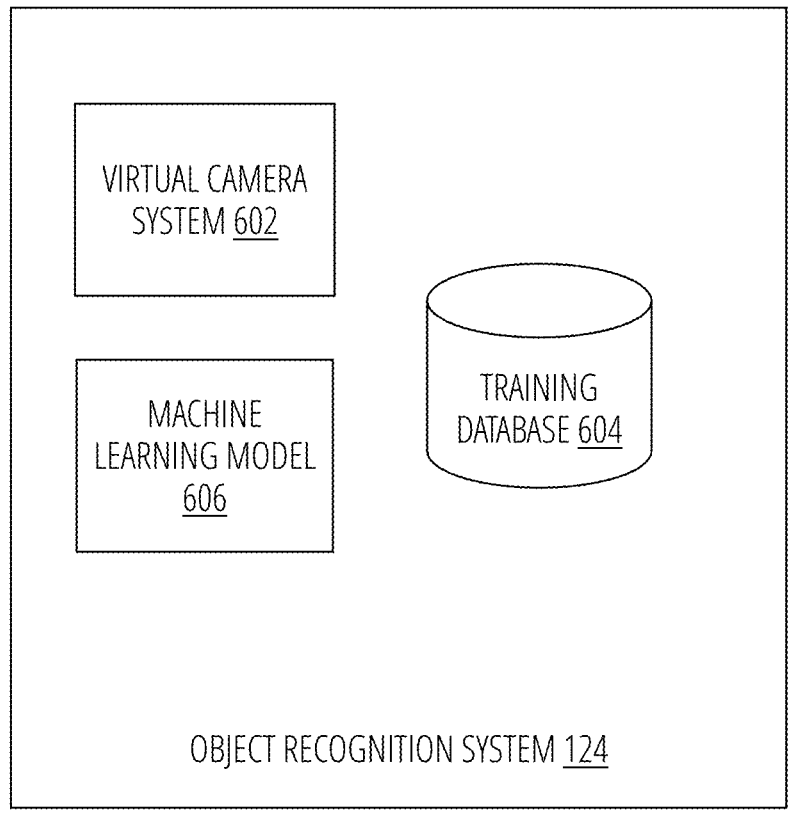
FIG. 6 is a block diagram illustrating an object recognition system, according to some example embodiments.

FIG. 6 is a block diagram illustrating an object recognition system 124 according to exemplary embodiments. The object recognition system 124 is shown as including a virtual camera system 602, a Machine learning model 606, and a training database 604, all configured to communicate with each other (e.g., via bus, shared memory, or a switch). Any one or more of these systems may be implemented using one or more processors (e.g., by configuring such one or more processors to perform functions described for that system and hence may include one or more processors).

Any one or more of the systems described may be implemented using hardware alone (e.g., one or more of the processors of a machine) or a combination of hardware and software. For example, any system described of the object recognition system 124 may physically include an arrangement of one or more of the processors (e.g., a subset of or among the one or more processors of the machine) configured to perform the operations described herein for that system. As another example, any system of the authentication challenge issuance system 122 may include software, hardware, or both, that configure an arrangement of one or more processors (e.g., among the one or more processors of the machine) to perform the operations described herein for that system. Accordingly, different systems of the object recognition system 124 may include and configure different arrangements of such processors or a single arrangement of such processors at different points in time. Moreover, any two or more systems of the object recognition system 124 may be combined into a single system, and the functions described herein for a single system may be subdivided among multiple systems. Furthermore, according to various example embodiments, systems described herein as being implemented within a single machine, database, or device may be distributed across multiple machines, databases, or devices.

In one example embodiment the virtual camera system 602 comprises a plurality of virtual cameras. The virtual camera system 602 may define different arrangements (e.g., projections) for the plurality of virtual cameras. An arrangement of a camera may be defined by the position of the camera in relation to an object (e.g., three-dimensional object).

In some examples, the virtual camera system 602 may define a first arrangement of the virtual cameras in which the virtual cameras are directly above the object. The rotation axis along which the virtual cameras are placed in relation to the object may be known and may correspond, to an upright orientation. Each of the virtual cameras may be implemented using software.

In some examples, each of the virtual cameras are placed at the interval of the angle θ (e.g., 60 degrees) around the axis and may be elevated by Φ (e.g., 30). In some examples, the elevation represents the scale of the object in relation to each of the virtual cameras. Thus, the virtual camera system 602 obtains 360 degrees/60 degrees=6 views for the object. The projected view of the first viewpoint may be represented by $V_1$. Thus, the projected view sequence may be represented as $[V_1, \ldots, V_6]$.

Given a three-dimensional object, different starting viewpoints (e.g., positions of the virtual cameras) will generate different sequences. The different sequences will yield different features when fed into the Machine learning model 606 as described in further detail below. Each object may be associated with a predefined category (e.g., aircraft, car, chair, etc.). The features of three-dimensional objects of the same category may be dissimilar due to different starting viewpoints. Therefore, the virtual camera system 602 further aligns sequences of the same class (e.g., same object category) to the same starting viewpoint.

The virtual camera system 602 further builds class-specific alignment functions $A_c(.)$ based on a set of permutation templates. The alignment functions may align the sequences to a canonical viewpoint. In some examples, a permutation function is used to process as an input, the original sequence of projected views $V=[V1, \ldots, V6]$ and a sequence of indices $I=[i_1, \ldots, i_6]$ and outputs a permuted sequence:

$$V_i = [V_{i_1}, \ldots, V_{i_6}].$$

The virtual camera system 602 constructs a permutation template based on the permutation function. In some examples the permutation template is constructed by:

$$P_i(V) = P_i(V, I_i)$$

where $I_i$ is the sequence template. The virtual camera system 602 may use the permutation template to construct the alignment function. In some examples, the alignment function is constructed by:

$$A_c(V) = P_{K_c(V)}(V)$$

where $K_c(V)$ is the function determining the index of the selected permutation template among the set of permutation templates (P . . . ). Thus, in some examples, the alignment function $A_c(V)$ is the function of $K_c(V)$. In some examples, where the orientation of the rotation axis is known (e.g. the rotation axis is fixed), only the starting viewpoints vary between each sequence of views. For example, if the virtual camera system 602 uses six virtual cameras, the virtual camera system 602 requires six permutation templates because there are only six possible starting view points. Therefore, six permutation templates are needed to achieve the goal of alignment. The virtual camera system 602 may specify several sequence templates $I_i$ used in the permutation templates by:

$$I_1 = [1,2,3,4,5,6],$$

$$I_2 = [2,3,4,5,6,1],$$

. . . .

$$I_6 = [6,1,2,3,4,5].$$

Therefore, as shown above, each sequence has a different starting view. In In some examples, the virtual camera system 602 may define a second arrangement of the virtual cameras in which the virtual cameras are placed on the vertices of a dodecahedron surrounding the object. Therefore, the upright orientation is not given (e.g., upright orientation is unknown). Thus, the virtual camera system 602 uses a projection method without an upright orientation assumption. In this case, the viewpoints are distributed in three-dimensional space. The virtual camera system 602 thus obtains a sequence of 20 projected views $V=[V_1, \ldots, V_{20}]$.

Without upright orientation, the virtual camera system 602 constructs an alignment function. In the example discussed above, the virtual camera system 602 requires 60 candidate permutation templates to achieve the goal of alignment. The 60 candidate permutation templates are required because the dodecahedron has 12 faces corresponding to 12 possible upright orientations and each upright orientation has 5 possible starting view points. Therefore, the virtual camera system 602 specifies several sequence templates $I_i$ used in the permutation templates by:

$$I_1=[1,2,3,4,5, \ldots 16,17,18,19,20],$$

$$I_2=[2,3,4,5,1, \ldots 17,18,19,20,16],$$

$$\ldots$$

$$I_5=[5,1,2,3,4, \ldots 20,16,17,18,19],$$

$$I_6=[13,18,19,14,8, \ldots 1,6,11,10,5],$$

$$I_7=[18,19,14,8,13, \ldots 6,11,10,5,1],$$

$$\ldots$$

$$I_{60}=[20,19,18,17,16, \ldots ,5,4,3,2,1].$$

Therefore, as shown above, each sequence has a different starting view. In one example embodiment the training database 604 comprises a set of three-dimensional objects and their associated sequence.

In one example, the machine learning model 606 comprises a machine-learning model trained to classify a three-dimensional object. In one example, the machine learning model 606 comprises of a recurrent neural network (RNN) and its variants such as Long Short Term Memory networks (LSTM) and Gated Recurrent Unit (GRU). In one example, the machine learning model 606 may be a sequence model. In one example, the machine learning model 606 may be a sequence-of-sequences model. Further details regarding the sequence model and the sequence-of-sequences model are provided in relation to FIG. 8 and FIG. 9, respectively.

Figure 7:
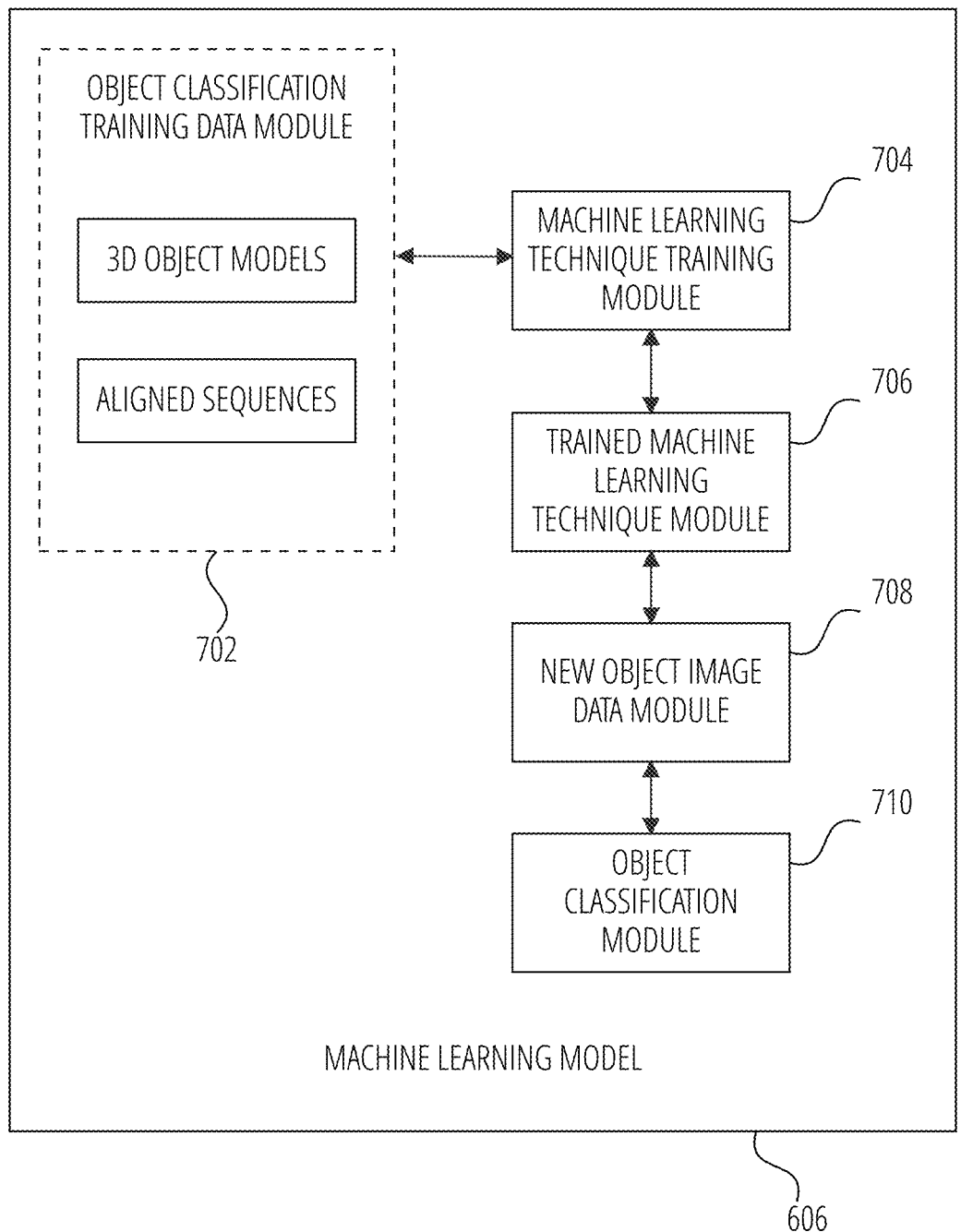
FIG. 7 illustrates a machine learning model, according to some example embodiments.

FIG. 7 illustrates a machine learning model 606, according to some example embodiments. The machine learning model 606 includes a machine learning technique training module 704, a trained machine learning technique module 706, a new object image data module 708, and an object classification module 710.

In some implementations, some modules of machine learning model 606 be implemented on the messaging client 104 and others may be implemented on the application servers 112. In some implementations, all of the modules of machine learning model 606 are implemented on messaging client 104 or on the application servers 112. In such cases, the application servers 112 communicate information to messaging client 104 based on the modules implemented and vice versa.

The object classification training data module 702 includes a set of three-dimensional objects with an associated aligned sequence. The set of three-dimensional objects and their associated aligned sequences are obtained by the object classification training data module 702 from the training database 604.

The machine learning technique training module 704 is trained to predict the object category of a three-dimensional object by analyzing projected views of the object captured by the virtual camera system 602.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., user login attempt features and known challenge response labels) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for predicting a days to pending amount for a given property.

The machine-learning algorithms utilize features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes, such as the days to pending amount.

Once the training data are collaged and processed, the machine learning technique training module 704 can be built using machine learning techniques. Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

In some embodiments, the machine learning technique training module 704 is trained to identify an object category of a three-dimensional object (e.g., identify a three-dimensional object) based on one or more features (e.g., training data received from the object classification training data module 702). In some embodiments the object recognition system 124 may train the machine learning technique training module 704 on a periodic basis (e.g., weekly, monthly, annually).

After being trained, the machine learning technique training module 704 is provided to the trained machine learning technique module 706. The trained machine learning technique module 706 is configured to receive projected views of a new three-dimensional from new object image data module 708. In some examples the trained machine learning technique module 706 is a sequence model. In some examples, the trained machine learning technique module 706 is a sequence-of-sequences model. For example, the new object image data module 708 receives a sequence of projected views captured by the virtual camera system 602. The new object image data module 708 instructs the trained machine learning technique module 706 to apply the trained machine learning technique to the sequence of projected views provided by the new object image data module 708. The trained machine learning technique module 706 provides a predicted best aligned sequence based on the sequence of projected views provided by the new object image data module 708.

The trained machine learning technique module 706 provides the predicted best aligned sequence to the object classification module 710. The object classification module 710 uses the predicted best aligned sequence to identify the three-dimensional object.

In some examples, the trained machine learning technique module 706 is updated using the best aligned sequence. For example, the trained machine learning technique module 706 is updated by calculating the function determining the index of the selected permutation template (e.g., best aligned sequence) among the set of permutation templates and computing a cross-entropy loss based on the previously determined function.

Figure 8:
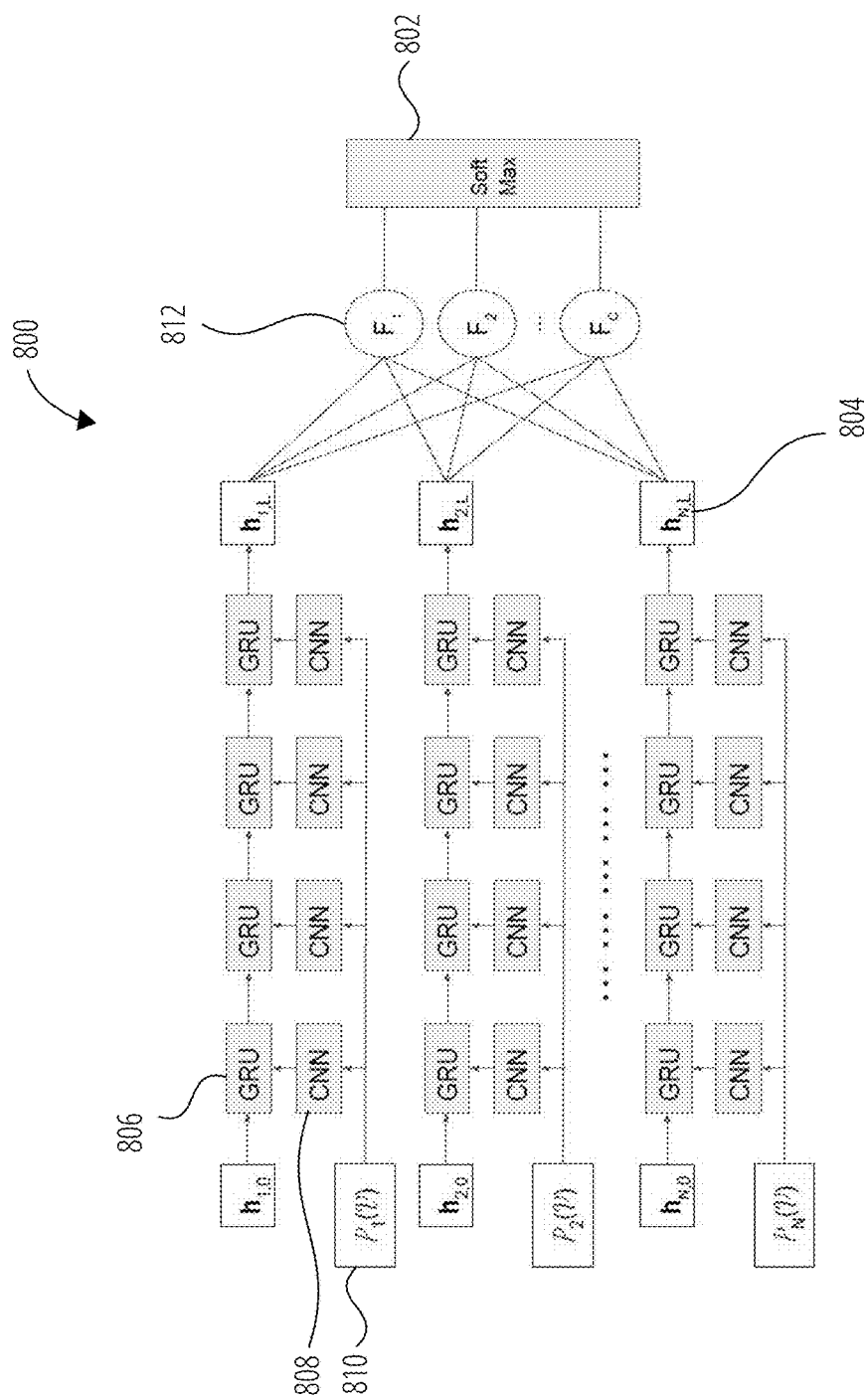
FIG. 8 illustrates a sequence model, according to some example embodiments.

FIG. 8 is an illustration of a sequence model 800. In some embodiments, the machine learning model 606 may comprise a sequence model 800. For example, the sequence model 800 includes an LSTM network and a GRU.

In one example embodiment, the sequence model 400 uses the GRU to obtain the representation of each sequence of projected views V. Given a sequence of projected views V of a 3D object, the sequence model first generates all possible candidate aligned sequences. For each view in each sequence $P_i(V)$ 810, the sequence model generates its view-wise feature through a convolutional neural network. The sequence model feeds each view's CNN feature 808 of each sequence $P_i(V)$ 810 into a GRU 806 to obtain the last hidden vector. For each permutation, the sequence model derives the last hidden vector. The sequence model uses all the different permutations in classification of the three-dimensional object. In some examples, the last hidden vector is defined as:

$$h_{i,L} = CNN\text{-}GRU(P_i(V))$$

where $L=|I|$ is the length of the sequence.

The representation of the sequence model is obtained by:

$$g_{sm}(P_i(V),W) = h_{i,L}$$

where W represents parameters of the CNN feature 808 and GRU 806. Therefore, the index of the best aligned sequence is calculated by:

$$K_c^{sm}(V) = \operatorname*{argmax}_{i \in [1,N]} w_c^T h_{i,L} + b_c$$

Each $F_c(V)$ 812 is a classifier which receives features as an input and computes a confidence score that represents that the permutation belongs to a predefined set of categories. The softmax layer 802 is used to compute a loss function which is used to train the neural network. In the sequence model 800 described above, each sequence is classified independently.

Figure 9:
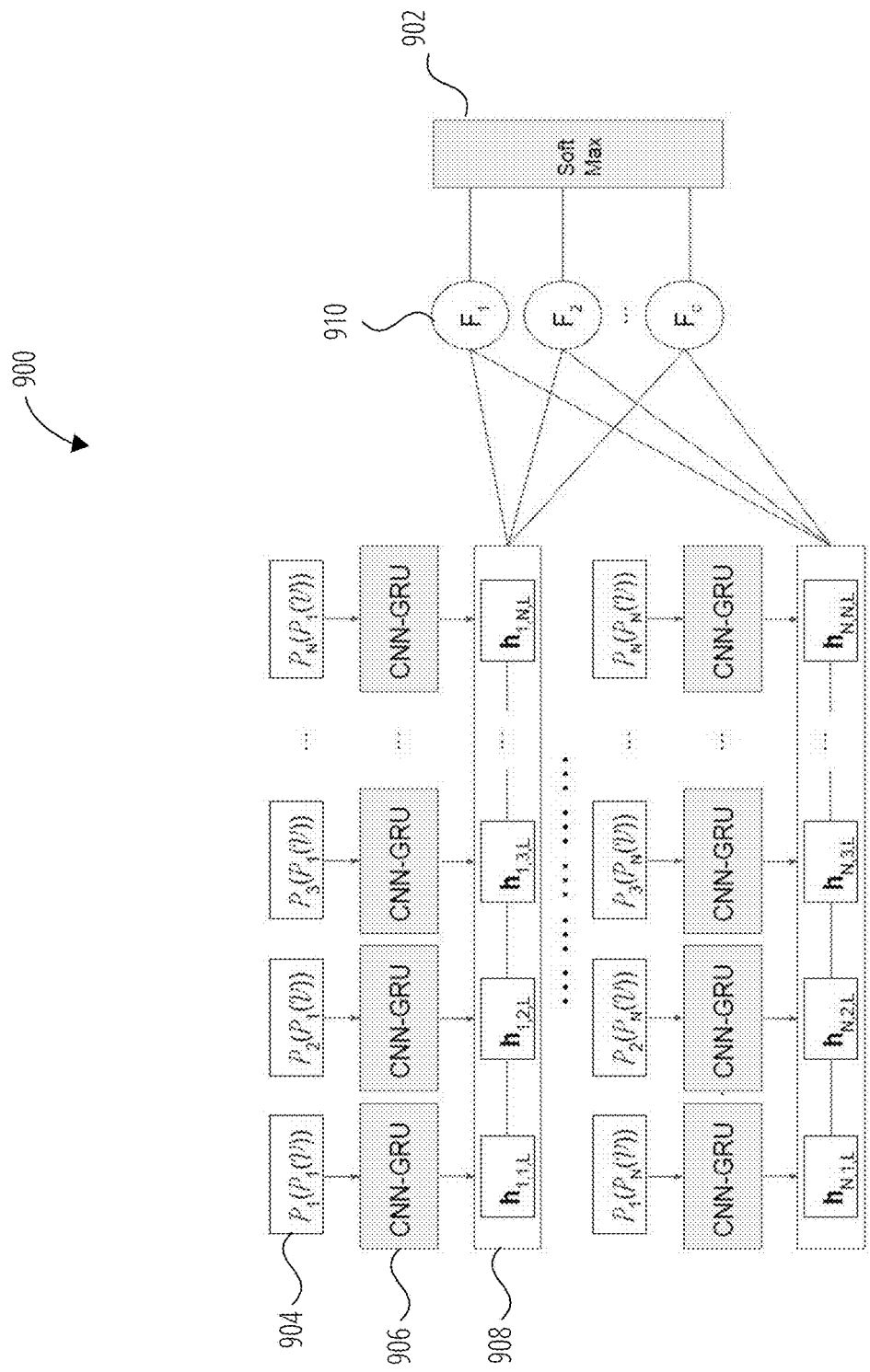
FIG. 9 illustrates a sequence-of-sequences model, according to some example embodiments.

FIG. 9 is an illustration of a sequence-of-sequences model 900 according to some example embodiments. In some embodiments, the machine learning model 606 may comprise a sequence-of-sequences model 900. The sequence-of-sequences model 900 treats the sequences obtained from all the permutation templates as another sequence. In some examples, the sequence-of-sequences model 900 exploits the order in this sequence of sequences. The sequence of sequences may be defined as:

$$V_i^+ = [P_1(P_i(V)), \ldots P_N(P_i(V))]$$

In this example, the last hidden vector 908 is defined as:

$$h_{i,j,L} = CNN\text{-}GRU(P_j(P_i(V)), W).$$

The representation of the sequence of sequences is obtained my concatenating features extracted from the sequence of sequences:

$$g_{sos}(P_i(v), W) = [h_{i,1,L}, \ldots, h_{i,N,L}]$$

In this example, the best aligned sequences are calculated by:

$$K_c^{sos}(V) = \underset{i \in [1,N]}{\mathrm{argmax}}\, w_c^T g_{sos}(P_i(V), W) + b_c$$

In the sequence-of-sequences model 900 described above, each permutation 904 is fed through both the CNN 906 and GRU 908 and further concatenated into one vector. The classification 910 is performed on the concatenated vector. For example, the classification 810 is performed on the concatenation of the aligned sequences. Therefore, the classification of the concatenation of the sequences takes into account a dependency between each sequence. The softmax layer 802 is used to compute a loss function which is used to train the neural network.

Figure 10:
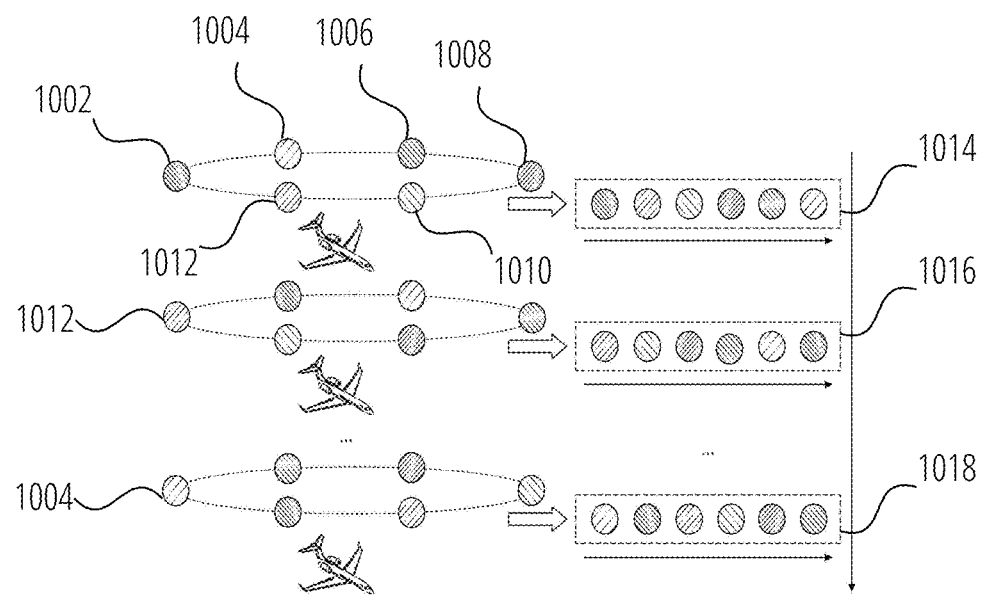
FIG. 10 illustrates virtual camera positions in a sequence-of-sequences model, according to some example embodiments

FIG. 10 is an illustration of virtual camera positions in a sequence-of-sequences model, according to some example embodiments. Each of the shaded circles 1002, 1004, 1006, 1008, 1010, and 1012 represent a virtual camera positioned over a 3D object (e.g., aircraft). As discussed above, different permutation templates generate difference sequences 1014, 1016, . . . , 1018 (e.g., Sequence 1, Sequence 2, . . . , Sequence N). Each sequence has a different starting view. For example, sequence 1014 has the starting view 1002, sequence 1016 has the starting view 1012, and sequence 1018 has the staring view 1004. Therefore, the model characterizes the order of projected views within the sequence but also describes the order across different sequences obtained from different permutations.

Figure 11:
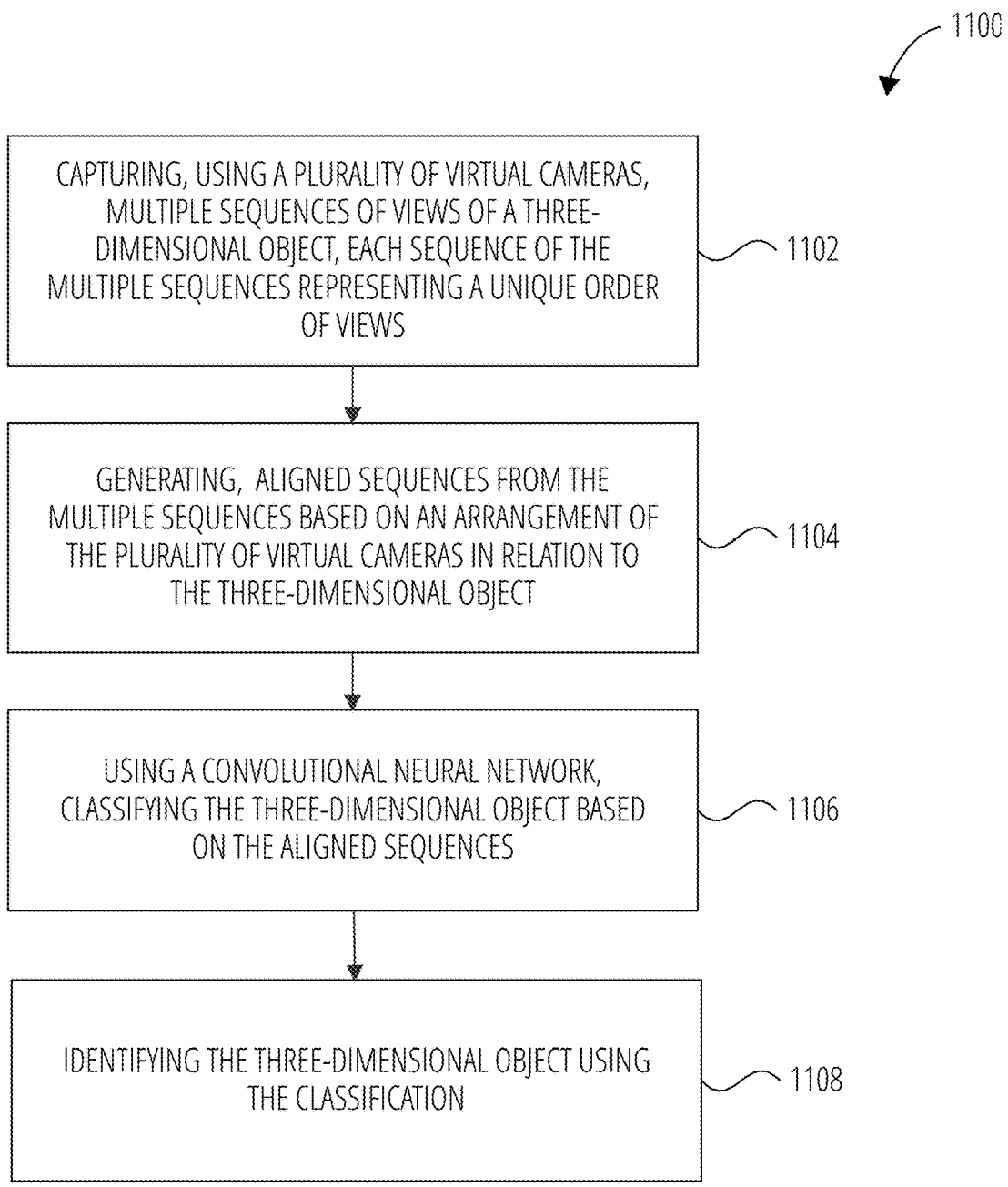
FIG. 11 is a flow diagram of a method for identifying a three-dimensional model using a sequence-of-sequences model, according to some example embodiments.

FIG. 11 is a flow diagram of a method 1100 for identifying a three-dimensional model using a sequence-of-sequences model, according to some example embodiments. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In operation 1102, the object recognition system 124 captures, using a plurality of virtual cameras, multiple sequences of views of a three-dimensional objection. Each sequence of the multiple sequences represents a unique order of the views. Therefore, each sequence of the multiple sequences has a different starting view. In some examples, operation 1102 may be performed by the virtual camera system 602.

In operation 1104, the object recognition system 124 generates aligned sequences from the multiple sequences based on an arrangement of the plurality of virtual cameras in relation to the three-dimensional object. In some examples, the arrangement of the virtual cameras corresponds to an upright orientation and a known rotation axis. The objection recognition system 122 may concatenate the aligned sequences into a single vector. In some examples, operation 704 may be performed by the virtual camera system 602.

In operation 1106, the object recognition system 124 uses a convolutional neural network to classify the three-dimensional object based on the aligned sequence. In some examples, the object recognition system 124 classifies the three-dimensional object based on the concatenated aligned sequences.

In operation 1108, the objection object recognition system 124 identifies the three-dimensional object. In some examples, operations 1106 and 1108 may be performed by the machine learning model 606.

Machine Architecture

Figure 12:
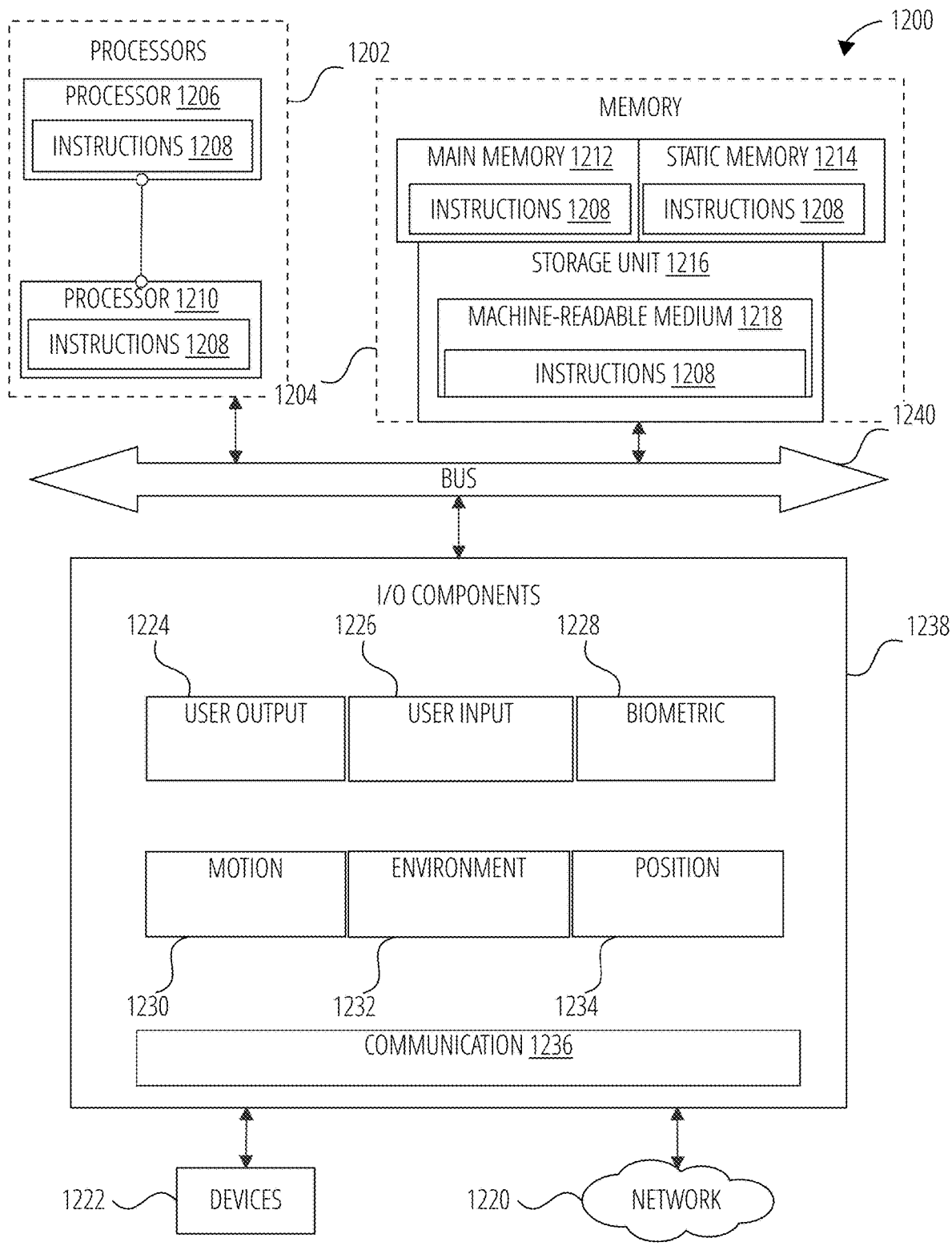
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1202, memory 1204, and input/output I/O components 1238, which may be configured to communicate with each other via a bus 1240. In an example, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single-core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the Processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various examples, the I/O components 1238 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface Component or another suitable device to interface with the network 1220. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, and memory of the processors 1202) and storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1236) and using any one of several well-known transfer protocols (e.g., hypertext transfer protocol (HTTP)). Similarly, the instructions 1208 may be transmitted or received using a transmission medium via a coupling (e.g., a peer-to-peer coupling) to the devices 1222.

Software Architecture

Figure 13:
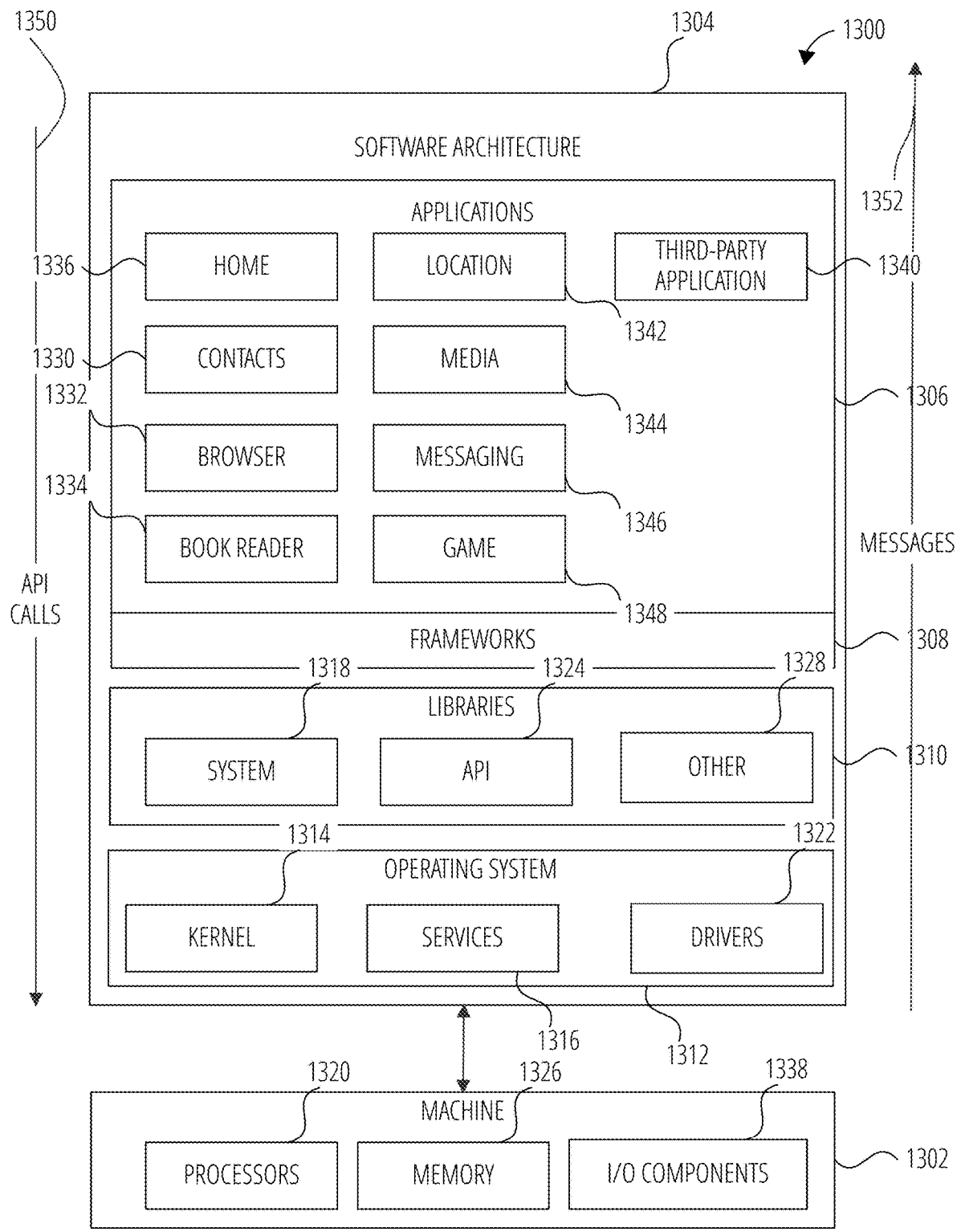
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   accessing, from a plurality of virtual cameras, multiple sequences of views of a three-dimensional object, each sequence of the multiple sequences representing a unique order of views, wherein each sequence of views of the multiple sequences of views has a unique starting view;
   generating, using one or more processors, aligned sequences from the multiple sequences based on an alignment function associated with the unique starting view of each sequence of views of the multiple sequences of views; and
   identifying the three-dimensional object using the aligned sequences.

2. The method of claim 1, wherein the plurality of virtual cameras is associated with an arrangement of the plurality of virtual cameras, wherein the arrangement of the plurality of virtual cameras corresponds to an upright orientation and a known rotation axis.

3. The method of claim 1, further comprising:
   classifying the three-dimensional object using a convolutional neural network.

4. The method of claim 1, wherein the aligned sequences are aligned to a canonical viewpoint.

5. The method of claim 3, further comprising:
   identifying the object using the classification.

6. The method of claim 1, further comprising:
   concatenating the aligned sequences; and
   classifying the three-dimensional object based on the concatenated aligned sequences.

7. The method of claim 3, further comprising:
   training the convolutional neural network by updating the convolutional neural network with the aligned sequences.

8. The method of claim 1, further comprising:
   classifying the three-dimensional object based on the aligned sequences using a gated recurrent unit.

9. A system comprising:
   a processor; and
   a memory storing instructions that, when executed by the processor, configure the system to perform operations comprising:
   accessing, from a plurality of virtual cameras, multiple sequences of views of a three-dimensional object, each sequence of the multiple sequences representing a unique order of views, wherein each sequence of views of the multiple sequences of views has a unique starting view;
   generating, using one or more processors, aligned sequences from the multiple sequences based on an alignment function associated with the unique starting view of each sequence of views of the multiple sequences of views; and
   identifying the three-dimensional object using the aligned sequences.

10. The system of claim 9, wherein the plurality of virtual cameras is associated with an arrangement of the plurality of virtual cameras, wherein the arrangement of the plurality of virtual cameras corresponds to an upright orientation and a known rotation axis.

11. The system of claim 9, classifying the three-dimensional object using a convolutional neural network.

12. The system of claim 9, wherein the aligned sequences are aligned to a canonical viewpoint.

13. The system of claim 11, further comprising:
identifying the object using the classification.

14. The system of claim 9, further comprising:
concatenating the aligned sequences; and
classifying the three-dimensional object based on the concatenated aligned sequences.

15. The system of claim 11, further comprising:
training the convolutional neural network by updating the convolutional neural network with the aligned sequences.

16. The system of claim 9, further comprising:
classifying the three-dimensional object based on the aligned sequences using a gated recurrent unit.

17. A non-transitory computer-readable storage medium, the computer-readable storage medium including instructions that when executed by a computer, cause the computer to perform operations comprising:
accessing, from a plurality of virtual cameras, multiple sequences of views of a three-dimensional object, each sequence of the multiple sequences representing a unique order of views, wherein each sequence of views of the multiple sequences of views has a unique starting view;
generating, using one or more processors, aligned sequences from the multiple sequences based on an alignment function associated with the unique starting view of each sequence of views of the multiple sequences of views; and
identifying the three-dimensional object using the aligned sequences.

18. The computer-readable storage medium of claim 17, wherein the plurality of virtual cameras is associated with an arrangement of the plurality of virtual cameras, wherein the arrangement of the plurality of virtual cameras corresponds to an upright orientation and a known rotation axis.

19. The computer-readable storage medium of claim 17, classifying the three-dimensional object using a convolutional neural network.

20. The computer-readable storage medium of claim 17, wherein the aligned sequences are aligned to a canonical viewpoint.

* * * * *